(12) United States Patent
Deguchi et al.

(10) Patent No.: US 6,344,122 B1
(45) Date of Patent: Feb. 5, 2002

(54) ELECTRODEIONIZATION APPARATUS

(75) Inventors: Toshiaki Deguchi; Kunihiro Iwasaki, both of Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/613,565

(22) Filed: Jul. 10, 2000

(30) Foreign Application Priority Data

Jul. 13, 1999 (JP) .......................................... 11-199246

(51) Int. Cl.⁷ ................................................ C25B 9/00
(52) U.S. Cl. .......................... 204/632; 204/635; 204/636
(58) Field of Search ............................... 204/632, 633, 204/634, 635, 636, 638

(56) References Cited

U.S. PATENT DOCUMENTS 4,931,160 A * 6/1990 Giuffrida ..................... 204/632
4,956,071 A * 9/1990 Giuffrida et al. ........... 204/632

FOREIGN PATENT DOCUMENTS

JP 4-72567 11/1992

* cited by examiner

*Primary Examiner*—Kathryn Gorgos
*Assistant Examiner*—Thomas H Parsons
(74) *Attorney, Agent, or Firm*—Kanesaka & Takeuchi

(57) ABSTRACT

An electrodeionization apparatus includes an anode; a cathode; cation-exchange membranes and anion-exchange membranes alternately arranged between the anode and the cathode; desalting compartments and concentrating compartments arranged alternately to be located between the cation-exchange membrane and the anion-exchange membrane; and partition members situated in the respective desalting compartments to form cells therein. The partition member has inclined portions inclined obliquely relative to a longitudinal direction of the desalting compartment to define the cells laterally and vertically. Thus, one cell faces obliquely at least one of the cells adjacent thereto to allow water to flow obliquely between the one cell and the at least one of the cells. An ion exchanger is filled in the respective cells. The ion exchanger do not pass through the partition member.

24 Claims, 8 Drawing Sheets

ELECTRODEIONIZATION APPARATUS

FIELD OF THE INVENTION

The present invention relates to an electrodeionization apparatus and, more particularly to an electrodeionization apparatus which provides extremely high resistivity and low concentration of weak electrolytic anion of treated water, thereby continuously producing pure water with high purity.

BACKGROUND OF THE INVENTION

An electrodeionization apparatus has a structure in which a plurality of cation-exchange membranes and a plurality of anion-exchange membranes are alternately arranged between electrodes in such a manner as to alternately form desalting compartments and concentrating compartments and the desalting compartments are filled with an ion exchanger. Voltage is applied between the cathode and the anode of the electrodeionization apparatus, water to be treated is introduced into the desalting compartments and concentrated water is introduced into the concentrating compartments, so that impurity ions permeate the membrane from the water to be treated to the concentrated water, thereby producing deionized water.

FIG. 12 is an exploded view showing the structure of the electrodeionization apparatus.

The electrodeionization apparatus includes a cathode end plate 1, a cathode 2 extending along the end plate 1, a cathode spacer 3 extending along the outer periphery of the cathode 2 which are superposed in this order. Further, a cation-exchange membrane 4, a frame 5 for defining a desalting compartment, an anion-exchange membrane 6, and a frame 7 for defining a concentrating compartment are superposed on the cathode spacer 3 in this order. The cation-exchange membrane 4, the frame 5 for defining a desalting compartment, the anion-exchange membrane 6, the frame 7 for defining a concentrating compartment compose one unit. The apparatus is composed of a plurality of such units superposed together. That is, membranes 4, frames 5, membranes 6, and frames 7 are repeatedly superposed one unit over the other unit. An anode 9 is superposed between the last anion-exchange membrane 6 and an anode spacer 8. An anode end plate 10 is superposed on the anodic electrode 9. The apparatus is tightened by bolts or the like.

The space defined by the inner surface of the frame 5 is the desalting compartment in which an ion exchanger 5R such as ion-exchange resin is filled. The space defined by the inner surface of the frame 7 is the concentrating compartment in which a spacer including a mesh spacer is disposed.

A direct electric current is supplied to pass between the anode 9 and the cathode 2, raw water to be treated is fed to the desalting compartment through a raw water inlet line 11, and concentrated water is fed to the concentrating compartment 8 through a concentrated water inlet line 12. The raw water fed to the desalting compartment flows through a layer filled with the ion-exchange resin whereby impurity ion in the raw water is removed so as to make the raw water deionized water which flows out through a deionized water outlet line 13.

Concentrated water fed to the concentrating compartment receives impurity ions permeating through the membranes 4, 6, and the concentrated water flows out through a concentrated water outlet line 14. Electrode water is passed within electrode compartments through introducing lines 15, 16 and discharging lines 17, 18, respectively.

An electrodeionization apparatus in which a desalting compartment is provided with vertical partition ribs for dividing the desalting compartment into cells being long in the vertical direction is disclosed in JP4-72567B. According to this electrodeionization apparatus having the desalting compartment divided into long cells by ribs in which ion-exchange resins are filled respectively, the channelizing phenomenon where the flow of water from the inlet to the outlet of the desalting compartment is partially one-sided is prevented and the compression and the ion-exchange resins in the desalting compartment is prevented from being compressed or moved.

In the electrodeionization apparatus of JP4-72567B, the number of the cells is limited because the cells are formed by dividing the desalting compartment in the vertical direction. That is a large number of cells can not be formed in the apparatus. Further, the flow of the water in a lateral direction is blocked by the ribs, so that the contact efficiency between the water and the ion-exchange resins is poor. In addition, the ion-exchange resins are compressed at lower portions of the cells so that the cells have a vacancy at upper portions thereof, whereby the rate of filling the ion-exchange resins tends to be poor.

OBJECT AND SUMMARY OF THE INVENTION

It is an object of the present invention to provide an electrodeionization apparatus which overcomes problems described above, which has high contact efficiency between water and ion exchanger, in which water is stirred, and which has high filling density of the ion exchanger.

It is another object of the present invention to provide an electrodeionization apparatus which allows electric current to pass with partially different current densities in one desalting compartment.

The electrodeionization apparatus of the present invention has desalting compartments, each of which is divided into a plurality of cells by a partition member, and an ion exchanger is filled in the respective cells. At least a part of the partition member facing the cell is inclined relative to a normal flow or vertical flow direction of the water in the desalting compartment. The inclined part of the partition member allows permeation of the water, but prevents the ion exchanger to pass therethrough. Therefore, at least a part of the water flowing into the desalting compartment should flow obliquely relative to the normal flow direction of water, so that the water is dispersed overall to the desalting compartment, thereby improving the contact efficiency between water and ion exchanger and improving the deionization property.

The water flows in the cells with being stirred by the inclined part of the member, so that a boundary layer of concentration along the surface of the membrane whereby a dispersion resistance of ions is lowered and the apparatus becomes possible to be operated with a high flow velocity.

In an aspect of the invention, the apparatus has a large number of cells arranged vertically and laterally. A plurality of cells are arranged along the membrane surface both in the normal flow direction of water and a direction perpendicular to the normal flow direction, thereby extremely improving the contact efficiency between water and ion exchanger. Since the height of each cell is low, the ion exchanger is scarcely compressed. A vacancy is not formed at an upper portion in the cell, and the cell is filled evenly with the ion exchanger.

The configuration of each cell seen by projecting it upon the surface of the membrane is preferably a hexagon or a quadrangle. In case of the hexagon, the cells are preferably arranged in such a manner that a pair of sides thereof extend in the normal flow direction of water. In the case of a quadrangle, the cells are preferably arranged in such a manner that the respective sides thereof extend obliquely relative to the normal flow direction of water.

According to the present invention, all of the cells may be filled with the same ion exchanger, or instead thereof some of the cells may be filled with ion exchanger different from the ion exchanger filled in the other cells. For example, an anion exchanger may be filled in first cells, a cation exchanger may be filled in second cells, and an amphoteric ion exchanger (or a mixture of the anion exchanger and the cation exchanger) may be filled in third cells.

According to the present invention, each cell may be filled with an ion exchanger having one ion exchange characteristics or having plural ion exchange characteristics. For instance, a mixture of an anion exchanger and an amphoteric ion exchanger may be filled in the cell. A mixture of a cation exchanger and an amphoteric ion exchanger may be filled in the cell.

According to the present invention, the electrode may be composed of a plurality of small electrodes, insulated from each other, arranged corresponding to the first cells and the second cells in order to apply voltage, different from the voltage applied to the second cells, to the first cells filled with ion exchanger of the same ion exchange characteristics. The electrode may be composed of a plurality of small electrodes, insulated from each other, arranged corresponding to the first cells, the second cells, and the third cells in order to apply different voltage to the first cells, the second cells, and the third cells.

According to the present invention, the electrode may be composed of a plurality of small electrodes, insulated from each other, arranged corresponding to the arrangement of the cells.

DETAILED DESCRIPTION OF THE PREFERRED EMBODIMENTS

Figure 1:
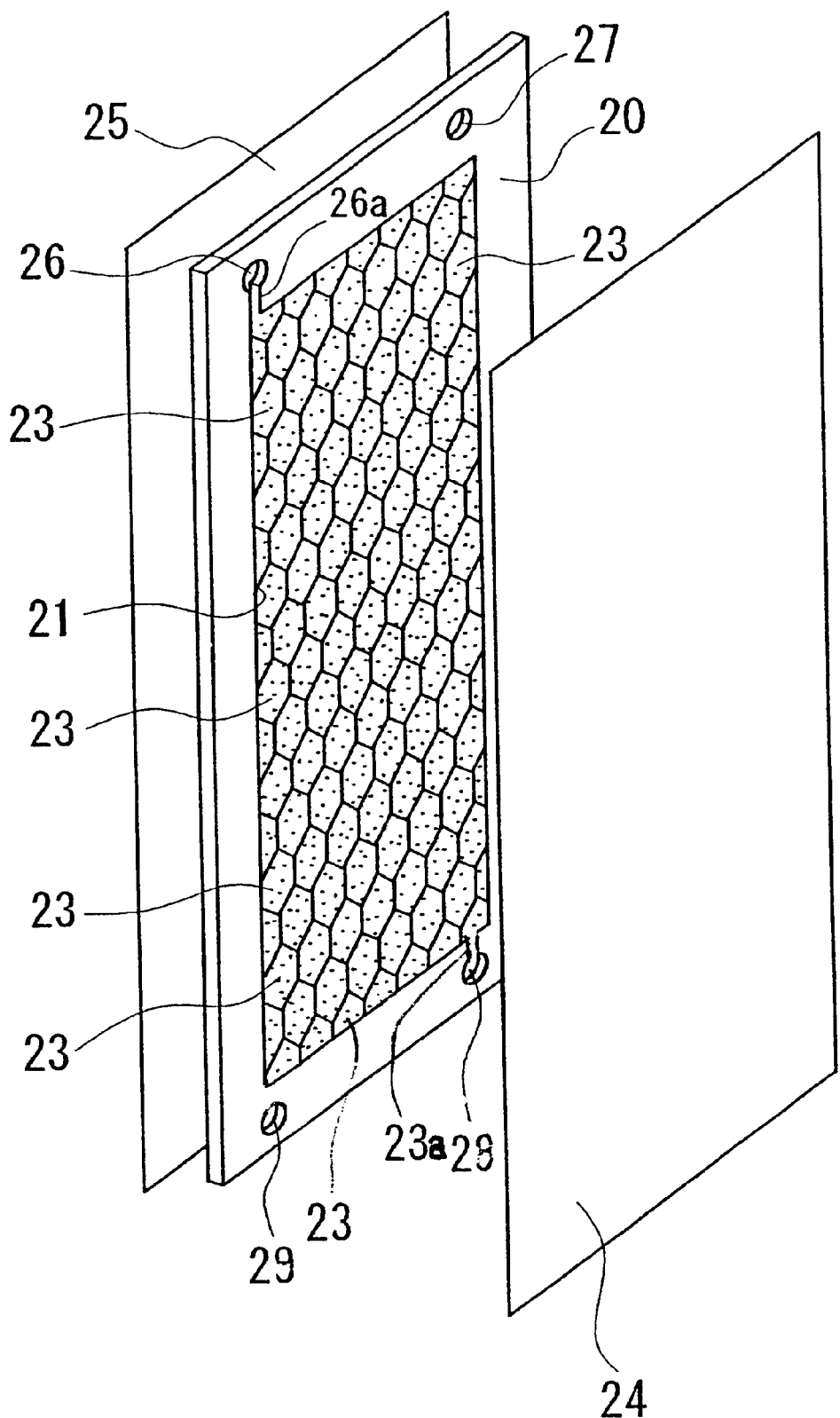
FIG. 1 is an exploded perspective view showing the structure of a desalting compartment according to an embodiment.
Figure 2:
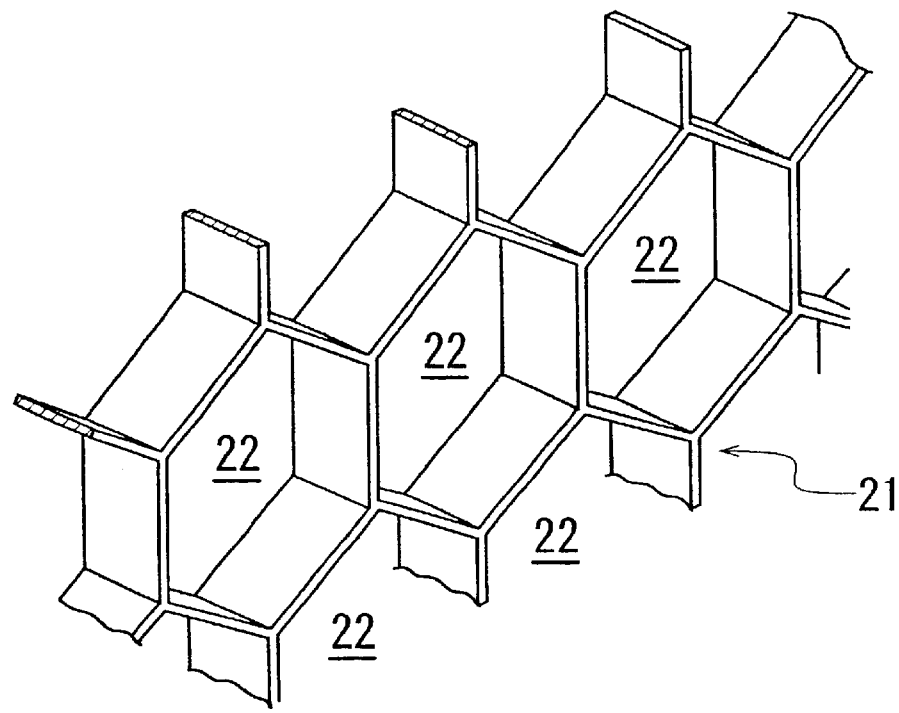
FIG. 2 is a perspective view showing a main part of a partition member.
Figure 3:
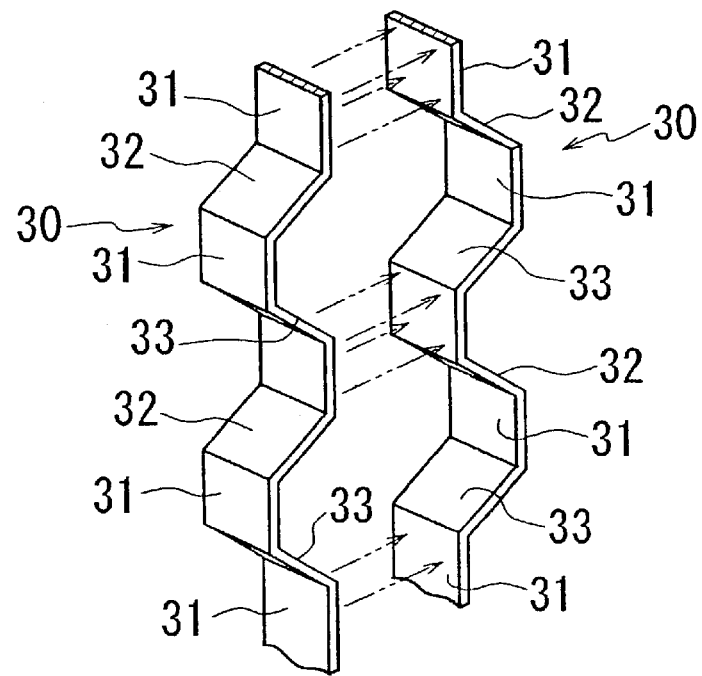
FIG. 3 is an exploded perspective view of the partition member.
Figure 4:
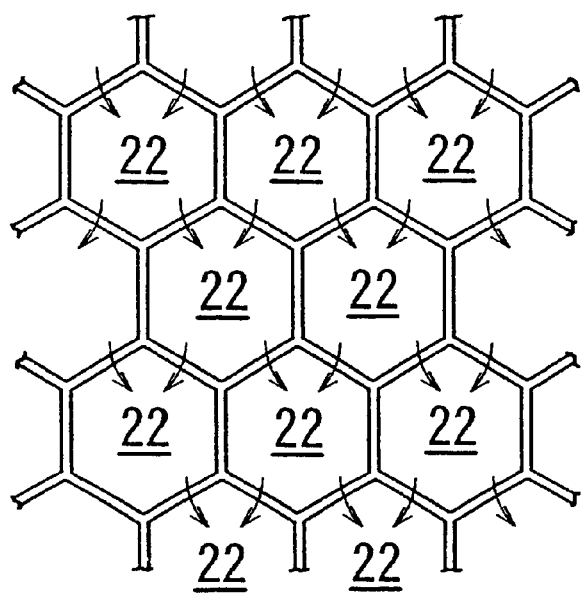
FIG. 4 is a front view illustrating the water flowing condition of the partition member.
Figure 5:
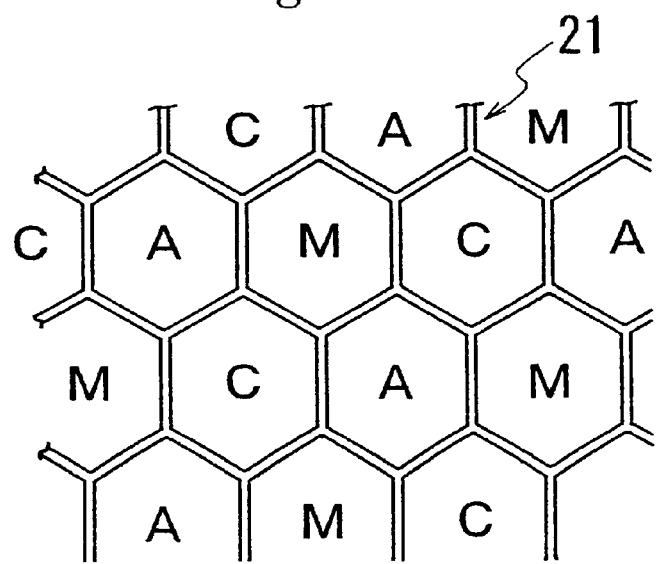
FIG. 5 is a front view showing an example of filling ion exchangers in the partition member.
Figure 6:
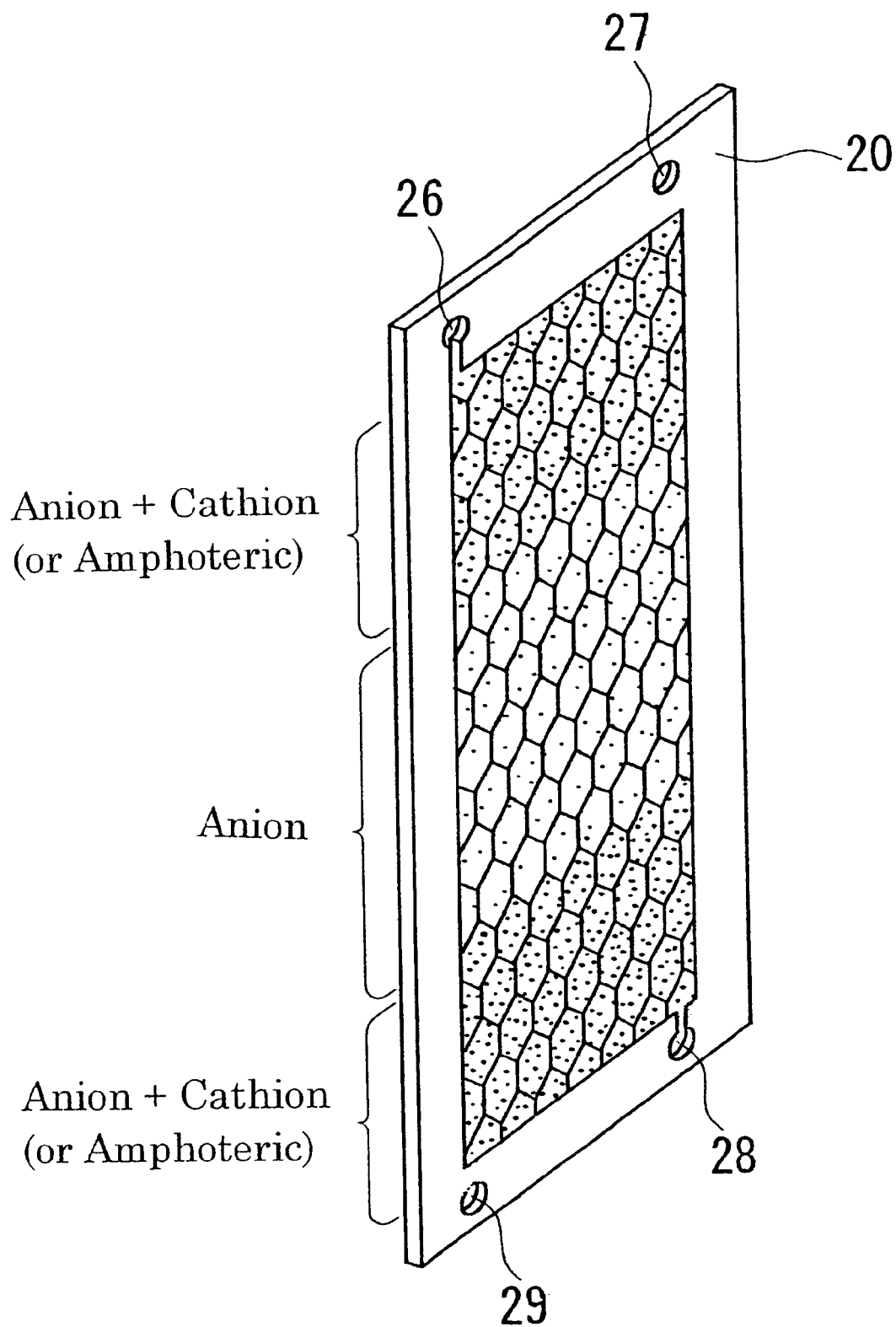
FIG. 6 is a perspective view showing another example of filling ion exchangers in the partition member.

Hereinafter, embodiments of the present invention will be described with reference to the attached drawings. FIG. 1 is an exploded perspective view showing the structure of a desalting compartment according to an embodiment, FIG. 2 is a perspective view showing a main part of a partition member, FIG. 3 is an exploded perspective view of the partition member, FIG. 4 is a front view illustrating the water flowing condition of the partition member, and FIGS. 5, 6 are a front view and a perspective view showing examples of filling ion exchangers in the partition member.

The desalting compartment comprises a rectangular frame 20, a partition member 21, preferably having conductivity, disposed in the frame 20, an ion exchanger 23 filled in cells 22 formed by the partition member 21, an anion-exchange membrane 24 and a cation exchange membrane 25 which are disposed to sandwich the frame 20.

The membranes 24, 25 preferably are uneven in thickness rather than even. Unevenness in thickness makes the membrane hard to be scratched even if it is pressed to the partition member 21.

The frame 20 is provided with a flow inlet 26 for introducing raw water to be treated and a flow inlet 27 for concentrated water in an upper portion thereof and with a flow outlet 28 for desalted water and a flow outlet 29 for concentrated water formed in a lower portion thereof. The flow inlet 26 and the flow outlet 28 are connected to the inside of the frame 20 through notch-like channels 26a, 28a, respectively.

Though only one channel 26a is illustrated to communicate with only the left top cell in FIG. 1, actually a plurality of channels 26a are formed in the upper portion of the frame 20 to uniformly distribute the raw water into the respective top cells aligned in the lateral direction, that is, the channels 26a directly communicate with the respective top cells. In the same manner, though only one channel 28a is illustrated to communicate with only the right bottom cell in FIG. 1, actually a plurality of channels 28a are formed in the lower portion of the frame 20 so as to directly communicate with the respective bottom cells.

The partition member 21 according to this embodiment is in a honeycomb form of a hexagonal shape in which a large number of cells are arranged in vertical and lateral directions in such a manner that a pair of sides of each cell 22 extend in the longitudinal direction of the frame 20, i.e. in the vertical direction.

The partition member 21 may be previously formed as an integral part or may be formed by combining a plurality parts. For example, as shown in FIG. 3, the partition member 21 may be formed by connecting vertical surfaces 31 of zigzag plates 30 as shown in FIG. 3. Each zigzag plate 30 comprises inclined surfaces 32, 33 which are connected at an angle 120° with the vertical surfaces 31. To connect the vertical surfaces 31, adhesives may be employed. The zigzag plate 30 is made of material which is permeable to water but not permeable to ion exchanger, e.g. woven fabric, non-woven fabric, mesh, and porous material. The zigzag plate 30 is preferably formed to have rigidity by using synthetic resin or metal having acid resistance and alkali resistance. The vertical surfaces 31 may be permeable or not permeable to water.

When the vertical surfaces 31 are not permeable to water, uniform contact between water and the ion exchanger in the cells can be achieved so that the quality of treated water is improved.

The number in the vertical arrangement of the cells is preferably 1 to 3 times, particularly 1.5 to 2.5 times, more particularly 2 times, of the number in the lateral arrangement of the cells. When the number in the vertical arrangement of the cells 22 is equal to or more than the number in the lateral arrangement of the cells 22, high-efficiency deionization can be achieved for every cell and pressure loss in flowing water in the desalting compartment should be small.

The vertical length of each cell 22 is longer, preferably by 3 times or less of, more preferably about 2 times, than the lateral length of the cell 22 so that the water tends to contact with the entire ion exchanger in the cell.

The desalting compartment is preferably 5–10 mm in thickness and 300–500 mm in height. The thickness equal or less than 10 mm and the height equal or more than 300 mm ensure enough deionization in the desalting compartment. The thickness equal or more than 5 mm and the height equal or less than 500 mm ensure reduced pressure loss and increased flow rate of water to be treated.

The partition member 21 may be fitted in the frame 20. The frame 20 may be provided with a water permeable sheet or a mesh attached to one side thereof and the partition member 21 may be bonded to the sheet or the mesh.

Figure 12:
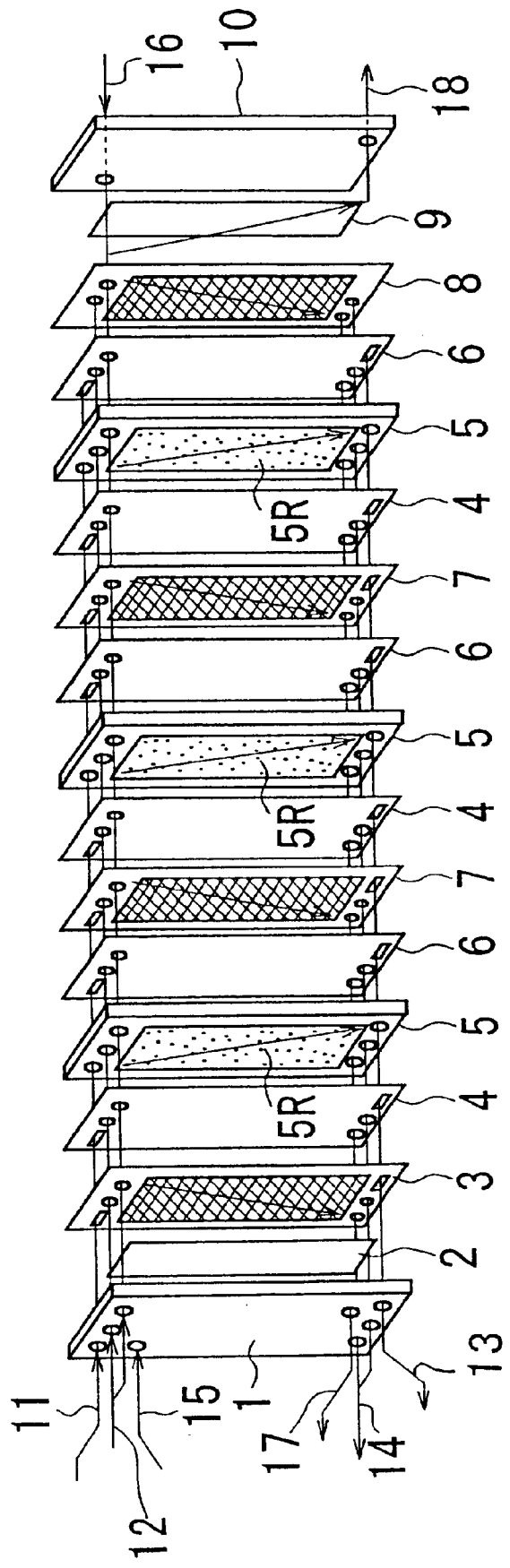
FIG. 12 is an exploded perspective view showing an electrodeionization apparatus according to the conventional one.

The other structure of the electrodeionization apparatus having this desalting compartment is the same as that of the aforementioned conventional one of FIG. 12 and the flow passages for raw water, concentrated water, and electrode water are also the same as those of the conventional one.

As shown in FIG. 12, a cathode compartment is formed and defined by the cathode, the cathode spacer, and the cation-exchange membrane.

When the desalting operation is conducted by passing raw water through this electrodeionization apparatus, the raw water introduced into the desalting compartment permeate the partition member 21 surrounding the cells 22 so as to flow into adjacent cells 22 and thus gradually flows downwardly. During this, the water is deionized. Finally, the water reaches the bottom of the desalting compartment and flows out to the flow outlet 28 through the channels 28a. Through the flow outlet 28, the water is taken out from the electrodeionization apparatus as the desalted water.

The general direction of water in the desalting compartment is a downward vertical direction because the channels 26a for introducing raw water exist at the top of the frame 20 and the channels 28a for taking out the desalted water exist at the bottom of the frame 20. The partition 21 is inclined relative to the vertical direction at the upper portions and lower portions for the respective cells, so that the water flows obliquely and downwardly from one cell 22 into the lower left cell 22 and the lower right cell 22. Therefore, the water flows substantially uniformly to all cells 22, thereby improving the contact efficiency between the water and the ion exchanger.

In this desalting compartment, since the cells 22 are relatively small, the downward pressure applied to the ion exchanger in each cell by the self weight of the ion exchanger and water pressure is low. Therefore, the ion exchanger is not compressed in any of the cells 22, thereby preventing the ion exchanger from being partially compressed at the lower portion of the cell.

Employed as the ion exchanger to be filled in the cells 22 may be an anion exchanger, a cation exchanger, an amphoteric ion exchanger, or a mixture of at least two of them. Examples of filling patterns are as follows:

(i) One of the anion exchanger, the cation exchanger, and the amphoteric ion exchanger is filled in all of the cells.

(ii) A mixture or mixtures of two or three of the anion exchanger, the cation exchanger, and the amphoteric ion exchanger is filled in all of the cells, wherein the mixing ratio and mixing kinds may be common for all of the cells or may be different partially or entirely.

(iii) The anion exchanger is filled in first cells, the cation exchanger is filled in second cells, a mixture of the anion exchanger and the cation exchanger, or the amphoteric ion exchanger is filled in residual cells i.e. third cells. The mixing ratio and mixing kinds of the mixture may be common for all of the cells or may be different partially or entirely. FIG. 5 is a view showing this pattern wherein A designates anion exchanger, C designates cation exchanger, and M designates amphoteric ion exchanger or the mixture. Though the kinds of ion exchanger in the adjacent cells are completely different from each other in FIG. 5, the filling pattern is not limited thereto. For instance, the anion exchanger is filled in all of cells arranged in a first lateral line, and the cation exchanger is filled in all of cells arranged in a second lateral line just below the first line, and the amphoteric ion exchanger (or a mixture of the anion exchanger and the cation exchanger) is filled in all of cells arranged in a third lateral line just below the second line.

(iv) As shown in FIG. 6, the desalting compartment is parted into three: an upper part, a middle part, and a lower part and the same kind of ion exchanger is filled in every part. In FIG. 6, a mixture of the anion exchanger and cation exchanger (or the amphoteric ion exchanger) is filled in cells in the upper part and the lower part and the anion exchanger is filled in the middle part of the desalting compartment. It should be noted that, in case of the mixture or mixtures, the mixing ratio and mixing kinds may be common for all of the cells or may be different partially or entirely.

In any of the cases (ii) through (iv), the number of cells in which anion exchanger is filled and the number of cells in which cation exchanger is filled may be controlled according to the ratios of anion and cation in the raw water.

To improve the efficiency of removing weak electrolyte such as silica, carbonic acid, and boric acid, it is preferable to make the raw water alkaline. As an alternative way for obtaining suitable removing condition, the number of cells in which anion exchanger is filled is increased.

In the present invention, each of the anode and the cathode in a shape of a plate may be composed of one entire plate or sheet having the same size as the desalting compartment or may be composed of a combination of a plurality of small plate electrodes.

Figure 7:
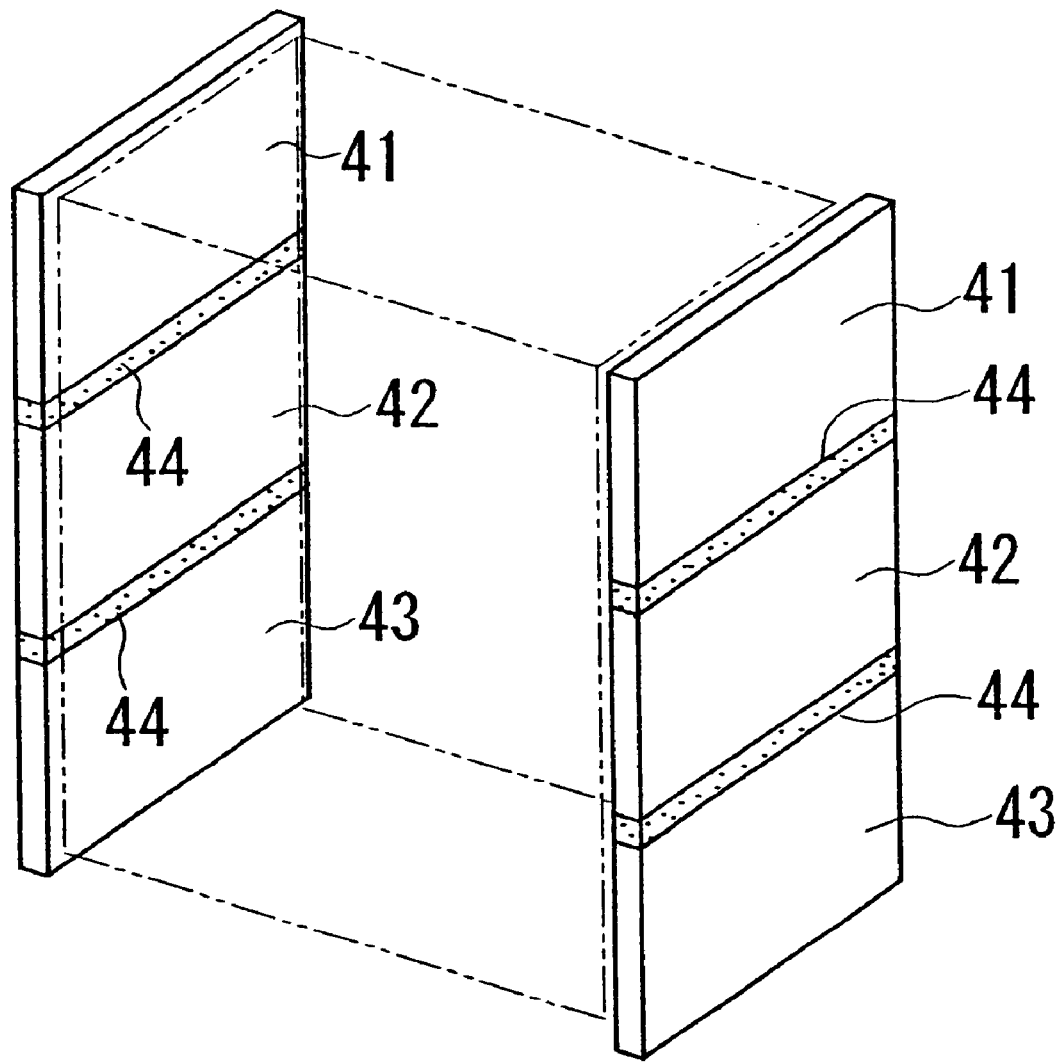
FIG. 7 is a perspective view showing an example of plate-shaped electrodes.

In case of the pattern in which the kinds of ion exchangers to fill the cells are different according to the upper part, the middle part, and the lower part of the desalting compartment as shown in FIG. 6, each of the plate electrodes may be composed of three small plate electrodes 41, 42, 43 and insulators 44 disposed between the adjacent ones of the small plate electrodes 41, 42, 43 as shown in FIG. 7. The current flows in such a manner as to make the current densities of the respective parts in the desalting compartment different from each other.

Though the electrode is composed of three middle-sized electrodes 41, 42, 43 disposed at three stages: upper, middle, lower portions in FIG. 7, the electrode may be composed of two electrodes, or four electrodes or more. Alternatively, hexagonal electrodes slightly smaller than the cells 22 may be combined with insulators disposed between the adjacent ones of the hexagonal electrodes so as to make the plate-shaped composite electrode having the same size of the desalting compartment. This enables to control the current densities of each cell.

Since an increase of the current density is effective for removing weak electrolyte, the cell or cells for removing the weak electrolyte may be controlled to have higher current density more than the other cells.

Figure 8:
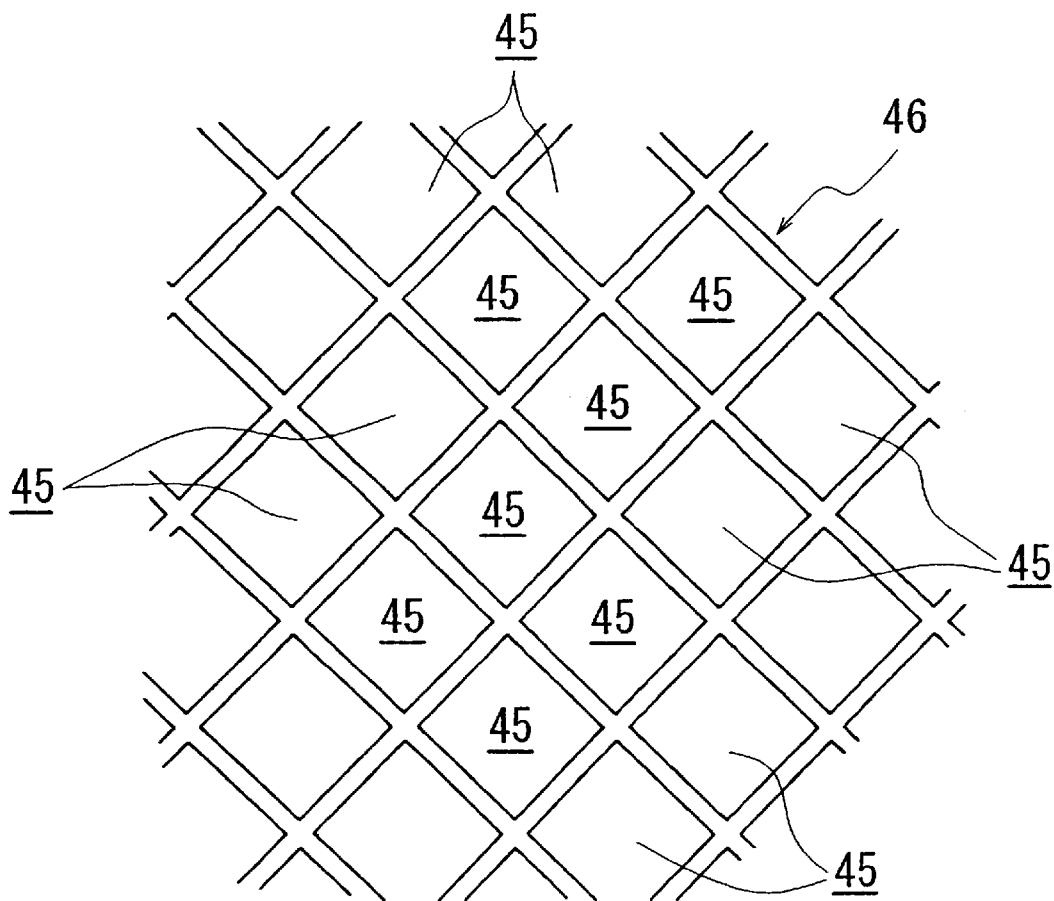
FIG. 8 is a front view showing another example of the partition member.
Figure 9:
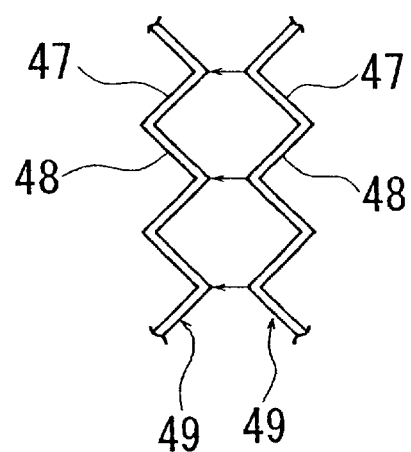
FIG. 9 is an exploded view of the partition member shown in FIG. 8.

Though the cells are hexagonal in FIGS. 1 through 6, the cells may be quadrangular e.g. rhombic just like cells 45 shown in FIG. 8. A partition member 46 defining the quadrangular cells is formed by connecting tops of zigzag water passable members 49, 49 composed of inclined surfaces 47, 48. The connection between the members 49, 49 may be achieved by adhesives or by engagement of notches (not shown) previously formed in the members 49.

Figure 10:
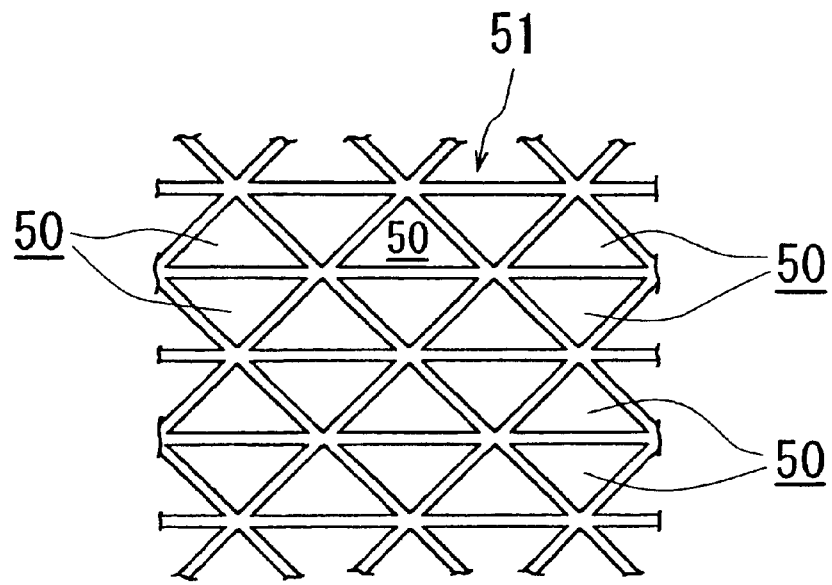
FIG. 10 is a front view showing further another example of the partition member.
Figure 11:
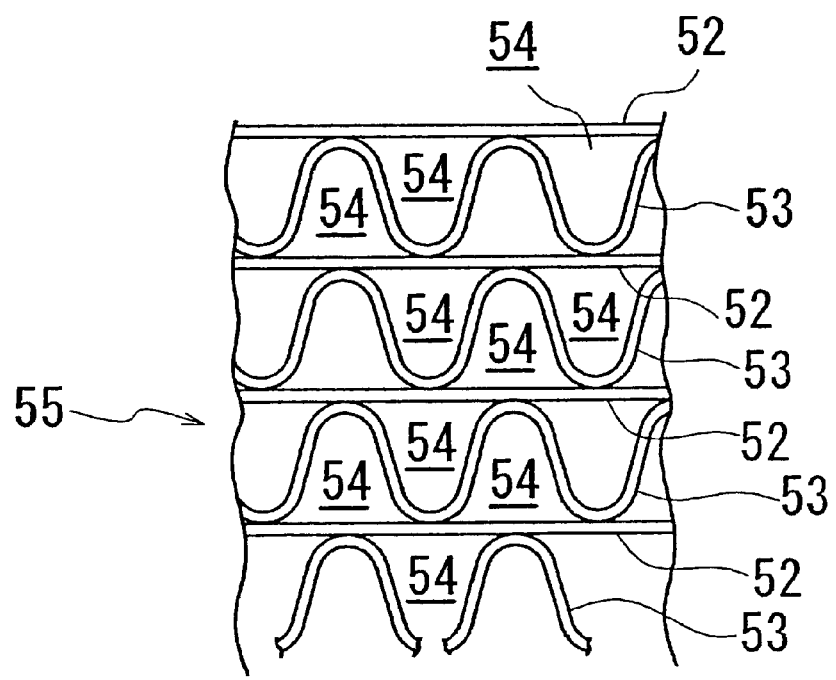
FIG. 11 is a front view showing still further another example of the partition member.

The partition member may be a triangle-type partition member 51 composed of triangular cells 50 as shown in FIG. 10 or may be a partition member 55 composed of cells 54 formed by a combination of lateral stripe members 52 and wave members 53.

In the electrodeionization apparatus of the present invention, the projected area to the ion exchange membrane of the cells is preferably 1–100 $cm^2$, particularly 2–50 $cm^2$, more particularly 3–10 $cm^2$. The distance between a pair of the anion-exchange membrane and the cation-exchange membrane via the desalting compartment i.e. the thickness of the desalting compartment is preferably 1.5–15 mm, particularly 3–10 mm. As the size of the cells is reduced, the amount of the ion exchanger to be filled in one cell is reduced so that the fluidization of the ion exchanger is restrained. In addition, the strength of the partition member and the strength of the desalting compartment are increased. However, the pressure loss of the water flowing in the desalting compartment is increased.

The ion exchanger to be filled is normally an ion exchange resin. But the ion exchanger may be an ion exchange fiber, ion exchange non-woven fabric, or a mixture of an ion exchange resin and an ion exchange fiber. Ion conductor such as conductive resin may be employed.

The ion exchanger may be an anion exchanger, a cation exchanger, a mixture of them, or an amphoteric ion exchanger.

So-called type I anion exchange resin and type II anion exchange resin and either one of them may be employed in the present invention. The type I has higher degree of basicity while the type II has higher regeneration rate, higher reaction speed, and higher strength. The combination of the type I and the type II will promote the separation of ion at a low current. The mixing ratio of the type I to the type II is preferably in a range from 1:2 to 1:5.

As the regeneration rate of the ion exchanger in the desalting compartment is increased, the quality of treated water is increased. Therefore, it is preferable to increase the amount of water to be split into hydrogen ion and hydroxide ion, contributing to the regeneration of the ion exchanger. For this, the ion exchanger is preferable to comprise the amphoteric ion exchanger having the function of splitting water into hydrogen ion and hydroxide ion in an amount of 5–30 wt. %.

The particle diameter of the ion exchanger is preferably 0.1–1 mm, particularly 0.2–0.6 mm.

According to a preferable way of filling the ion exchanger, the ion exchanger corresponding to 90–140%, more preferably 95–105% of the volume of the cells are introduced into the cells and, after that, the cells are sandwiched between the ion exchange membranes so as to precisely fill the ion exchanger in the cells.

According to another way of filling the ion exchanger in the cells, after the ion exchanger is filled in the cells and the ion exchange membranes are disposed on the opposite sides of the desalting compartment, raw water is supplied to swell the ion exchanger inside the cells and, after that, the frames and the membranes are tightened up such that the volume ratio becomes 90–105% more preferably 95–100%.

The volume of the ion exchanger when swelled by water is preferably 105–115% of the volume of the ion exchanger when it is dry. The ion exchanger having such characteristics is precisely filled in the desalting compartment and the concentrating compartment. That is, as water is fed to the desalting compartment or the concentrating compartment in which the dry ion exchanger is filled, the ion exchanger is swelled to be 105% or more, thereby achieving the precise filling of the ion exchanger.

The concentrating compartment in one aspect may have a thickness of 0.3–1 mm and may be provided with a spacer of 20–60 meshes therein.

The concentrating compartment in another aspect may have a thickness of 2.5–5 mm and may be filled with ion exchanger. The concentrating compartment filled with an ion exchanger allows electric current to easily pass the inside thereof and intensifies turbulence of water inside thereof, thus improving the efficiency of electric current. In the concentrating compartment having thickness of 2.5 mm or more, Na ion concentration near the surface of the cation-exchange membrane is lower than that in the concentrating compartment having thickness less than 2.5 mm so as to allow Na ion in the desalting compartment to easily permeate the cation-exchange membrane.

In the concentrating compartment having thickness of 5 mm or less, the water flows with a smaller resistance than in the concentrating compartment having thickness of more than 5 mm.

As the same manner in the desalting compartment, a partition member may be arranged in the concentrating compartment to form a plurality of cells therein and an ion exchanger may be filled in the respective cells.

The concentrating compartment having a plurality of cells overall is suitable for deionization of water having Na ion concentration of 0.5 ppm.

The concentrating compartment may have cells only at its upper part and no cells at its lower part, wherein carbonic acid is easily removed during the water flowing in the upper part of the concentrating compartment and Na ion is easily removed during flowing in the lower part of the concentrating compartment.

The concentrating compartment may have cells at its upper part and vertical ribs at its lower part, whereby carbonic acid is easily removed during the water flowing in the upper part of the concentrating compartment and Na ion is easily removed during flowing in the lower part of the concentrating compartment.

In any one of the aforementioned constructions of the concentrating compartment, the $CO_2$ concentration of the water to be treated is preferably 10 ppm or less.

Normally, acid anode water passed through the anodic compartment is introduced to the cathodic compartment and neutralized therein, because the cathodic compartment is generally alkaline. The neutralization lowers the conductivity and partially increase the voltage of the cathodic compartment, so that scales are easy to form. Therefore, it is preferable to employ as the cathode a mesh electrode, a non-woven fabric electrode, or a combination thereof because such an electrode has a large electrode area, thereby lowering the current density on the electrode surface and thus preventing precipitation of scales.

For operating the electrodeionization apparatus of the present invention, it is preferable to circulate concentrated water and to control the circulated water so as to have an ion concentration 5–40 times higher than the feed water. In this case, it is preferable to electrically separate and discharge hardness i.e. scale ingredients in the concentrated water so as to make the Langelier Index in the circulated water negative. A weak acid ion exchange resin may be used for removing hardness elements.

The electrodeionization apparatus of the present invention is preferably operated in such a condition that the scale index SI is 500 or less. The scale index is obtained by the following expression:

Scale Index SI=[Load per unit area of membrane of inorganic carbonate ($mg—CO_2/hr \cdot dm^2$)]·[Ca concentration of concentrated water ($mg—CaCO_3/L$)]

wherein "Load per unit area of membrane of inorganic carbonate ($mg—CO_2/hr \cdot dm^2$)" is load ($mg—CO_2/hr$) per 1 $dm^2$ of the anion exchange membrane of the electrodeionization apparatus and "Ca concentration of concentrated water" is Ca concentration of the water flowing out of the concentrating compartment (converted to $CaCO_3$).

The inventors of this invention conducted experiments for making clear the forming mechanism of scales in the electrodeionization apparatus. In the experiments, scales were intentionally formed by mixing excessive amounts of inorganic carbononate and Ca in feed water to the electrodeionization apparatus. After that, the apparatus was disassembled and the concentrating compartment was observed. As a result, it was found that calcium carbonate adhered to the anion-exchange membrane at the concentrating compartment side.

Accordingly, the inventors presumed that the forming mechanism of scales was as follows. That is, when the electrodeionization apparatus is in operation, areas near a surface of the anion-exchange membrane locally become alkaline. $HCO_3^-$ or $CO_3^{2-}$ and $OH^-$ permeating the anion-exchange membrane from the desalting compartment are concentrated near the anion-exchange membrane. In addition, Ca in water in the concentrating compartment is drawn or driven to the anion-exchange membrane, so that $HCO_3^-$ or $CO_3^{2-}$ and $OH^-$ react with Ca to form scales of calcium carbonate on the anion-exchange membrane.

The inventors further studied and found that no scale forms when the scale index SI obtained by multiplying the load per unit area of inorganic carbonate of the anion-exchange membrane by the Ca concentration of concentrated water is 500 or less. The load of inorganic carbonate ($mg—CO_2/hr$) of the electrodeionization apparatus is obtained by multiplying the inorganic carbonate concentration ($mg—CO_2/L$) of water fed to the electrodeionization apparatus by the flow rate (L/hr). Therefore, the load per unit area of inorganic carbonate ($mg—CO_2/hr \cdot dm^2$) is the product of [the inorganic carbonate concentration ($mg—CO_2/L$) of feed water] and [the flow rate per cell(L/hr)/the effective area of cells of the anion exchange membrane ($dm^2$)].

By controlling the scale index SI to be 500 or less, precipitation of scales of calcium carbonate can be securely prevented in the concentrating compartment of the electrodeionization apparatus, thus enabling the stable operation of the electrodeionization apparatus for a long period of time.

In the electrodeionization apparatus, electric current more than the theoretical amount required to discharge ions from feed water is supplied to cause dissociation of water in the desalting compartments so as to continuously regenerate the ion exchanger. Therefore, increase in electric current to be supplied increases the alkalinity of pH at the surfaces of anion-exchange membranes, facilitating the precipitation of calcium carbonate. Accordingly, the permissible SI varies according to the value of electric current.

In the electrodeionization apparatus which is directed to producing water having resistivity of about 10 $MΩ \cdot cm$, the SI not exceeding 200, preferably not exceeding 150, is enough, when the required removing rate of silica is less than 90% or when the current efficiency during its operation exceeds 20%. In view of economic consideration, the SI is preferably in a range between 80 and 200 to avoid treatment by a degassing apparatus, a softener, and/or such other extra device.

In case of the electrodeionization apparatus in which the required removing rate of silica is 90% or more, i.e. the current efficiency during its operation is 20% or less, the SI is preferably 120 or less, particularly 80 or less. In view of the economic consideration, the SI is preferably in a range between 50 and 120.

In case of the electrodeionization apparatus in which the concentrating compartments are filled with the ion exchanger, the $OH^-$ ions permeating through the anion-exchange membrane are easy to move in the concentrating compartment, so that the scale is dispersed. In this case, the permissible SI is 80 or more even preferably 80–200 when the electric current is increased. The more preferable SI in this case is in a range of between 80 and 150. If economic consideration is not taken, SI lower than 80 is also permissible.

To lower the SI to the specific value, there are some methods as follows. One of the methods is to lower the Ca concentration in the concentrated water by removing Ca by lowering the recovery of water or by the use of a Ca removing device such as a softener. Another method is to lower the load on the membrane surface of the inorganic carbonate by reducing the amount of the water to be treated in the electrodeionization apparatus or removing inorganic carbonate by the use of a degassing device disposed at upstream of the electrodeionization apparatus. An alternative method of lowering the load on membrane surface of inorganic carbonate is to control the electric current of the electrodeionization apparatus.

When the thickness of the desalting compartment is 5 mm or more, the operational voltage V/N is preferably 2–10V and the space velocity is preferably 150/h or more. In the operational voltage V/N, V is the voltage between the cathode and the anode and N is a total of the number of the desalting compartments and the number of the concentrating compartments. It should be noted that N is not the number of the cells. The operational voltage of 2V or more brings excellent quality of the product water, and the operational voltage of 10V or less brings reduced electric cost.

The electrodeionization apparatus having a desalting compartment of 5 mm or more in thickness can be operated with linear velocity of 75 m/h or more and current efficiency between 20% and 40%. According to this operation, excellent quality of purified water and reduced electric cost can be achieved.

The electrodeionization apparatus having a desalting compartment of 5 mm or more in thickness can be operated with current density of 100 $mA/dm^2$ or more and with the amount of water permeating the ion-exchange membrane of 1 $m^3/m^2/h$ or more. According to this operation, excellent quality of treated water can be achieved.

During the operation of the electrodeionization apparatus in which the ratio of the cation exchanger to the anion exchanger filled in the desalting compartment is 3:7 to 5:5, the rate of restoration at a lower part of the desalting compartment is 80% or more. This means that excellent quality of treated water is achieved.

As the electrodeionization apparatus of the present invention is operated with recovery of water 80% or more, the conductivity of water in the concentrating compartment should be high, thereby achieving excellent quality of treated water.

Water to be treated having $CO_2$ concentration of 10 ppm or less may be passed through a reverse osmosis apparatus before being introduced into the electrodeionization apparatus of the present invention.

As described above, because of the large number of cells arranged vertically and laterally in the desalting compartment, various kinds of ion exchangers can be filled. Therefore, the arrangement and mixing ratio of the ion exchangers can be freely selected to be filled according to objective. The existence of a large number of cells makes the area of one cell smaller, thereby increasing the density of filled ion exchanger. Even when there is a cell (or some cells) insufficiently filled, the other cells are not affected, thereby increasing the density of filled ion exchanger as a whole. The existence of a large number of cells achieves uniform filling of ion exchangers and increases the strength of the compartment so that the ion exchangers can be held by strong compression.

Since water permeates the partition member, the water may be treated according to the respective condition in each cell.

The water treated by the electrodeionization apparatus of the present invention may be used as pure water for washing semiconductor chips, for a boiler water, and for many other purposes.

What is claimed is:

1. An electrodeionization apparatus comprising:
   an anode;
   a cathode;
   cation-exchange membranes and anion-exchange membranes alternately arranged between the anode and the cathode;
   desalting compartments where water to be treated flows and concentrating compartments where concentrated water flows, said desalting compartments and concentrating compartments being arranged alternately to allow each compartment to be located between the cation-exchange membrane and the anion-exchange membrane;
   partition members situated in the respective desalting compartments to form in each desalting compartment cells defined by the partition member, the cation-exchange membrane and the anion-exchange membrane, said partition member having inclined portions inclined obliquely relative to a longitudinal direction of the desalting compartment to define the cells laterally and vertically so that one cell faces obliquely at least one of the cells adjacent thereto to allow water to flow obliquely between said one cell and said at least one of the cells; and
   an ion exchanger filled in the respective cells so that the ion exchanger do not pass through the partition member.

2. An electrodeionization apparatus according to claim 1, wherein said cells are plurally arranged in a vertical direction and in a lateral direction along surfaces of the membranes.

3. An electrodeionization apparatus according to claim 2, wherein a number of the cells arranged in the vertical direction is 1–2 times larger than a number of the cells arranged in the lateral direction.

4. An electrodeionization apparatus according to claim 1, wherein a vertical length of each cell is larger than a lateral length thereof.

5. An electrodeionization apparatus according to claim 1, wherein each cell projecting upon a surface of the membrane has a quadrangle shape.

6. An electrodeionization apparatus according to claim 1, wherein each cell projecting upon a surface of the membrane has a hexagon shape.

7. An electrodeionization apparatus according to claim 6, wherein the hexagonal cell has a pair of vertical sides extending in a vertical direction so that water does not substantially pass the vertical sides of the partition member, but passes other sides of the partition member.

8. An electrodeionization apparatus according to claim 1, wherein each concentrating compartment has a thickness of 2.5 mm to 5 mm, and a second ion exchanger is filled in the concentrating compartment.

9. An electrodeionization apparatus according to claim 1, further comprising:
   a second partition member situated in at least an upper part of each concentrating compartment to form therein second cells defined by the second partition member, the cation-exchange membrane and the anion-exchange membrane, said second partition member having second inclined portions inclined obliquely relative to a longitudinal direction of the concentrating compartment to define the second cells laterally and vertically so that one second cell faces obliquely at least one of the second cells adjacent thereto to allow water to flow obliquely between said one second cell and said at least one of the second cells, and
   a second ion exchanger filled in the respective second cells so that the second ion exchanger do not pass through the second partition member.

10. An electrodeionization apparatus according to claim 9, wherein said second cells are formed throughout the concentrating compartment.

11. An electrodeionization apparatus according to claim 9, wherein said second partition member is disposed only in the upper part of the concentrating compartment.

12. An electrodeionization apparatus according to claim 9, wherein said concentrating compartment has ribs extending in a vertical direction at a lower part of the concentrating compartment.

13. An electrodeionization apparatus according to claim 1, wherein each of the cation-exchange membranes and the anion-exchange membranes is uneven in a thickness.

14. An electrodeionization apparatus according to claim 1, wherein each desalting compartment has a thickness in a range from 5 mm to 10 mm, and a height in a range from 300 mm to 500 mm.

15. An electrodeionization apparatus according to claim 1, further comprising a cathodic compartment defined by the cation-exchange membrane.

16. An electrodeionization apparatus according to claim 1, wherein at least some of the cells are filled with the ion exchanger having same ion exchange characteristics.

17. An electrodeionization apparatus according to claim 1, wherein said ion exchanger includes plural kinds of ion exchangers having different ion exchange characteristics, at least some of the cells being filled with plural kinds of the ion exchangers.

18. An electrodeionization apparatus according to claim 17, wherein 5–30% of the ion exchanger filled in said at least some of the cells is an amphoteric ion exchanger.

19. An electrodeionization apparatus according to claim 1, wherein said cells are composed of first cells filled with the ion exchanger having same ion exchange characteristics, and second cells filled with the ion exchanger having ion exchange characteristics different from that of the ion exchanger filled in the first cells.

20. An electrodeionization apparatus according to claim 19, wherein each of said anode and cathode is composed of a plurality of small electrodes corresponding to an arrangement of the cells to apply different voltages to the first cells and the second cells.

21. An electrodeionization apparatus according to claim 1, wherein each of said anode and cathode is composed of a plurality of small electrodes insulated from each other corresponding to an arrangement of the cells.

22. An electrodeionization apparatus according to claim 1, wherein said ion exchanger before filled is dry resin having a volume to become 105–115% when swelled after filled for treatment.

23. An electrodeionization apparatus according to claim 1, wherein said cation-exchange membranes and anion-exchange membranes have projected areas, each having 1–100 cm$^2$.

24. An electrodeionization apparatus according to claim 1, wherein said cells in one row disposed laterally in the desalting compartment are arranged in a staggered relationship to the cells disposed laterally in another row disposed under the one row to allow water to flow vertically obliquely to another cells.

* * * * *